T. HENRICHSEN.
SADDLETREE.
APPLICATION FILED JULY 24, 1912.
1,058,302.
Patented Apr. 8, 1913.
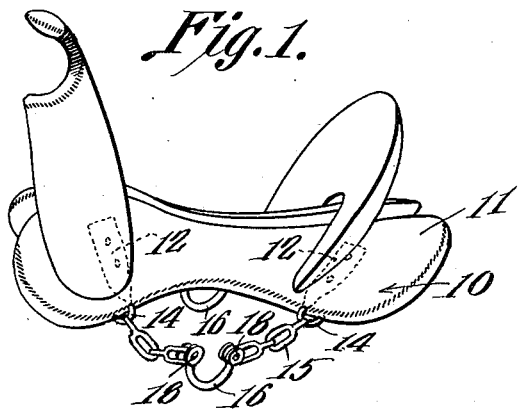
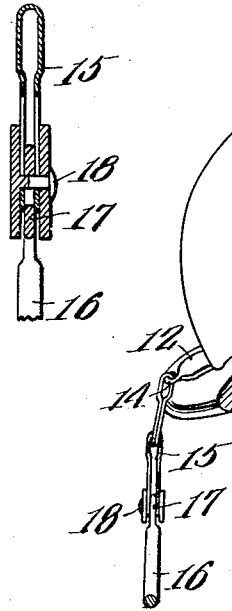
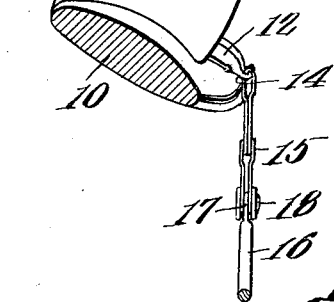
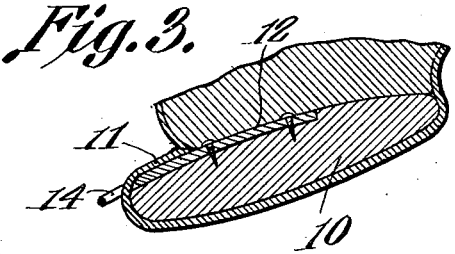
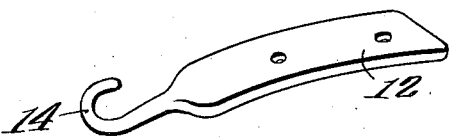
Theodore Henrichsen,
Inventor
by C. A. Snow & Co.
Attorneys

UNITED STATES PATENT OFFICE.

THEODORE HENRICHSEN, OF PORTLAND, OREGON.

SADDLETREE.

1,058,302.  Specification of Letters Patent.  Patented Apr. 8, 1913.

Application filed July 24, 1912. Serial No. 711,285.

*To all whom it may concern:*

Be it known that I, THEODORE HENRICHSEN, a citizen of the United States, residing at Portland, in the county of Multnomah and State of Oregon, have invented a new and useful Saddletree, of which the following is a specification.

This invention relates to an improvement in saddle trees.

The primary object of the invention is to provide a saddle tree with means to which the rigging may be attached.

A further object of the invention is to provide an attaching means which may be adjusted with regard to the saddle.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a perspective view. Fig. 2 is a transverse section. Fig. 3 is a sectional view showing the manner of attaching the chain retainer. Fig. 4 is a detail view of one of said retainers. Fig. 5 is a detail view of the adjustable connection between the bar and the chains.

In the drawings, 10 designates the saddle tree which is of the usual construction. This tree is provided with a cover 11 of rawhide or canvas, and secured to each side of the same are a pair of plates 12 which terminate in the hooks 14, the tree being cut away to receive the plates. The hooks are disposed on the same plane as the plates, the terminals of the hooks contacting with the tree to prevent the displacement of the chains 15 which are attached to the hooks. The chains of each pair of hooks are attached to a semi-circular bar 16, the terminal 17 of said bar receiving a pin 18 which passes through the link of the chain. The rigging is attached to this semi-circular plate, the plate forming a secure hanger for the rigging. It will be noted that the chain may be shortened or lengthened as desired, the curved hanger bar being capable of attachment to any of the links.

The many advantages of a construction of this character will be clearly apparent as it will be noted that the same forms a secure and convenient hanger which may be adjusted with respect to the tree. Particular attention is called to the fact that the chain may be readily detached from the plates when desired and that when the rigging is secured to the chains the same are positively held against detachment. It will also be seen that the device may be easily and economically manufactured and that the same may be readily attached to trees now in use without altering their construction.

What is claimed is:—

1. In a saddle, a rigging support including a plurality of plates secured to each side of the tree, said plates terminating in hooks which are disposed in the same plane as the plates, chains connected to the hooks, and a curved bar connecting the chains of each pair.

2. In a saddle, a rigging support including a plurality of plates secured to each side of the tree, said plates terminating in hooks which are disposed in the same plane as the plates, chains connected to the hooks, and a curved bar adjustably connected to the chains of each pair.

In testimony that I claim the foregoing as my own, I have hereto affixed my signature in the presence of two witnesses.

THEODORE HENRICHSEN.

Witnesses:
 HENRY HASPER,
 WOLDEMAR HAUPT.

Copies of this patent may be obtained for five cents each, by addressing the "Commissioner of Patents, Washington, D. C."